April 2, 1957    A. B. STEELE    2,787,461
COMBINATION DOOR AND LATCH CONTROL MECHANISM FOR MOTOR VEHICLES
Filed March 5, 1953    3 Sheets-Sheet 1

INVENTOR.
ALVIN B. STEELE
BY
ATTORNEY

ALVIN B. STEELE
INVENTOR.

BY

ATTORNEY

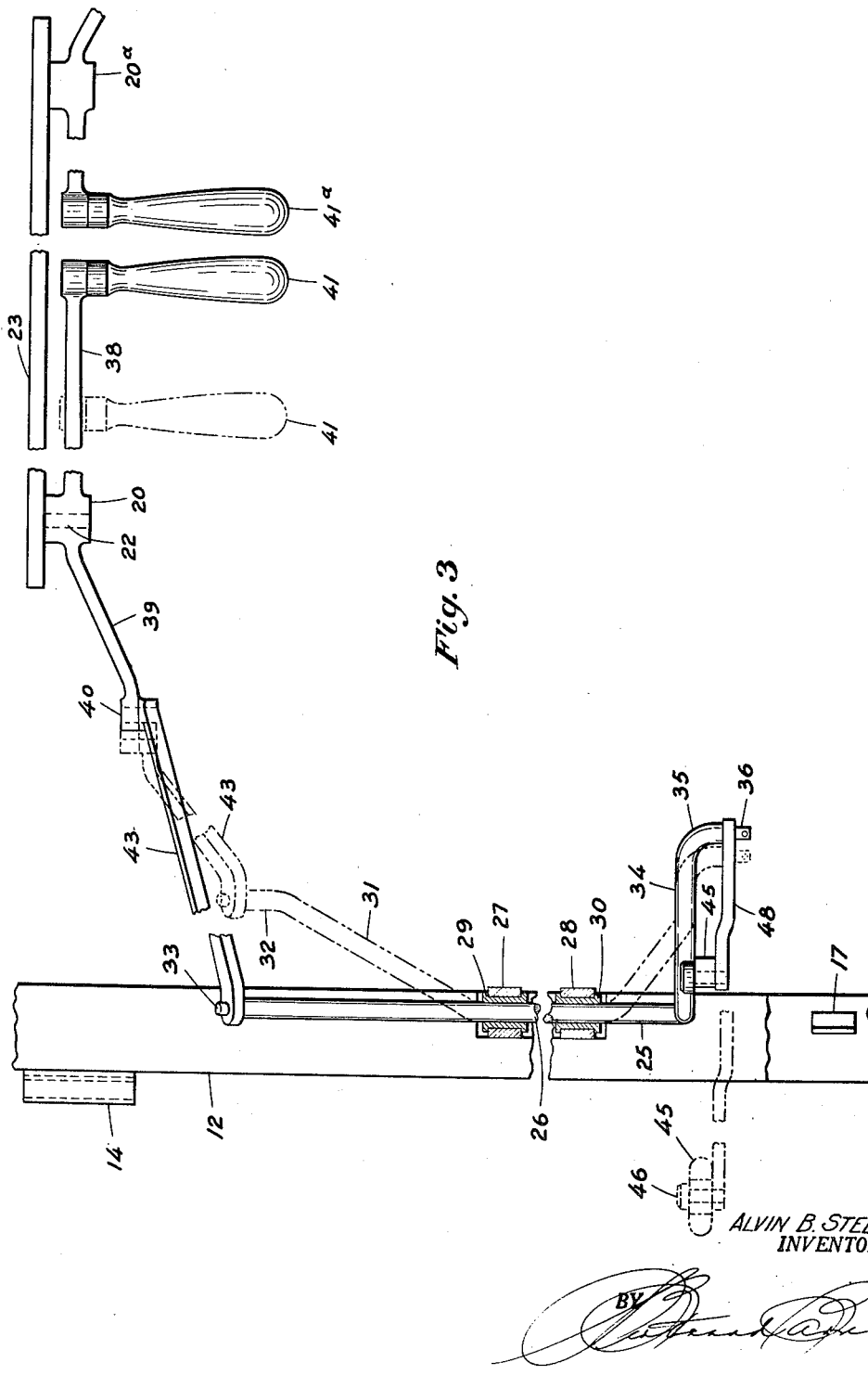

United States Patent Office 2,787,461
Patented Apr. 2, 1957

2,787,461

COMBINATION DOOR AND LATCH CONTROL MECHANISM FOR MOTOR VEHICLES

Alvin B. Steele, Brooklyn, N. Y.

Application March 5, 1953, Serial No. 340,420

8 Claims. (Cl. 268—3)

This invention relates to motor vehicles, and is particularly directed to a device for opening and closing the doors of a vehicle, such as a taxicab or limousine, in which the doors are located in a separate compartment remote from the operator of the vehicle.

Essentially the same operating mechanism, with minor alterations and variations, can be applied with equal facility to motor buses, motor trucks, and other vehicles in which the doors are located at a considerable distance from the driver's seat.

This application represents an improvement over the construction shown in my prior U. S. Patent No. 1,969,767, issued November 8, 1938, on a Door Opening and Closing Device.

The primary object of my invention is to provide a control mechanism, which will enable the driver of a vehicle, such as a limousine or taxicab, in which the front seat is separated from the rear portion of the body, the doors being located in the rear portion of the body, to open and close the rear doors of the vehicle, without leaving the driving seat, or reaching out and extending his arms rearward and disturbing the passengers in the rear of the vehicle, the operating mechanism releasing the latch of the door in the process of opening it.

The primary feature of the invention resides in the positive means provided for opening either, or both doors of a vehicle, opening or releasing the corresponding door latch in the process of opening the door, retaining the door in the open position for any required period, and positively closing the door again.

Another feature of the invention is to provide a door operating mechanism, which may be completely arranged within the top and sides of the body of a motor vehicle for concealment, so as not to alter or detract from the appearance of the motor vehicle.

Another feature of the mechanism resides in the fact that it can be operated, adjusted, and maintained in working order by persons of ordinary skill, without special tools or equipment.

Another feature of the mechanism resides in the fact that all parts thereof are positively connected to one another in such a manner as to eliminate lost motion as far as possible, and positively unlatch, open and close the doors by means of a simple control, without special adjustments on the part of the operator.

A primary object is to provide a unit which is simple, compact, all of the individual parts being relatively simple and inexpensive to produce and adjust, so that the entire unit can be produced and installed in a motor vehicle at a relatively low cost.

Another object is to provide a unit which is readily adaptable to use in a wide range of vehicles, such as taxicabs, limousines, motor buses and trucks, in a wide range of sizes and types, the essentials of the construction remaining the same.

The accompanying drawings, illustrative of one embodiment of my invention, together with the description of its construction and the method of installation, operation and utilization thereof, will serve to clarify further objects and advantages of my invention.

In the drawings:

Fig. 3 is a front elevation of the mechanism shown in Figs. 1 and 2, looking rearward from the driver's compartment, showing the relative position of the parts of the mechanism in the closed position and the position assumed by the same elements, when the door is opened, taken at 3—3, Fig. 1.

Figures 1, 1A:
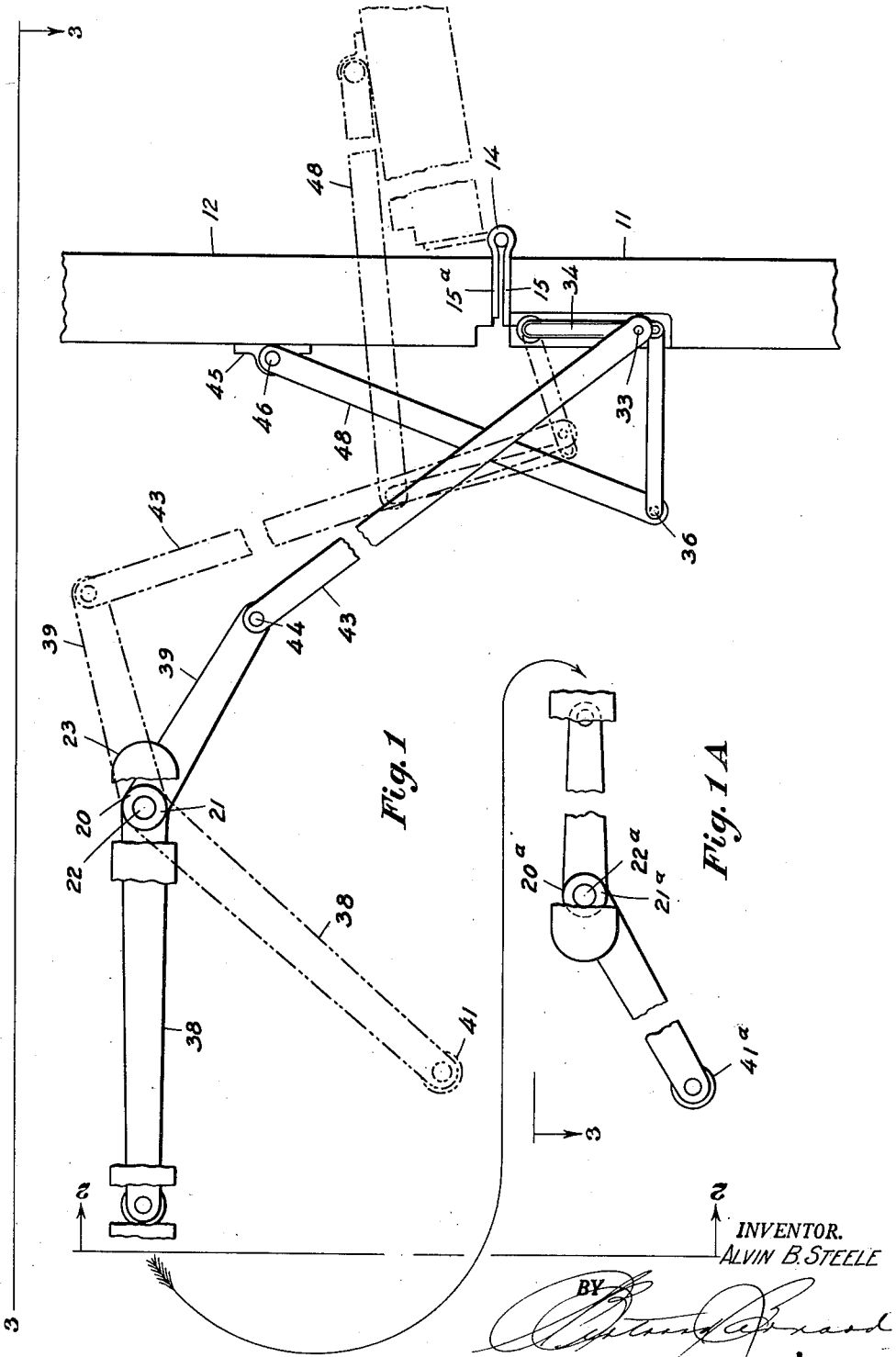
Fig. 1 is a schematic plan view of the door and latch actuating mechanism, as installed in the body of a vehicle, showing one of the vehicle doors in the closed and the open position.
Fig. 1a is an extension of one side of Fig. 1, showing the control means for the opposite door of the vehicle.

It will be understood that the following description of the construction and the method of operation of the combination door and latch control mechanism for motor vehicles, is intended as explanatory of the invention and not restrictive thereof.

In the drawings, the same reference numerals designate the same parts throughout the various views, except where otherwise indicated.

Figure 2:
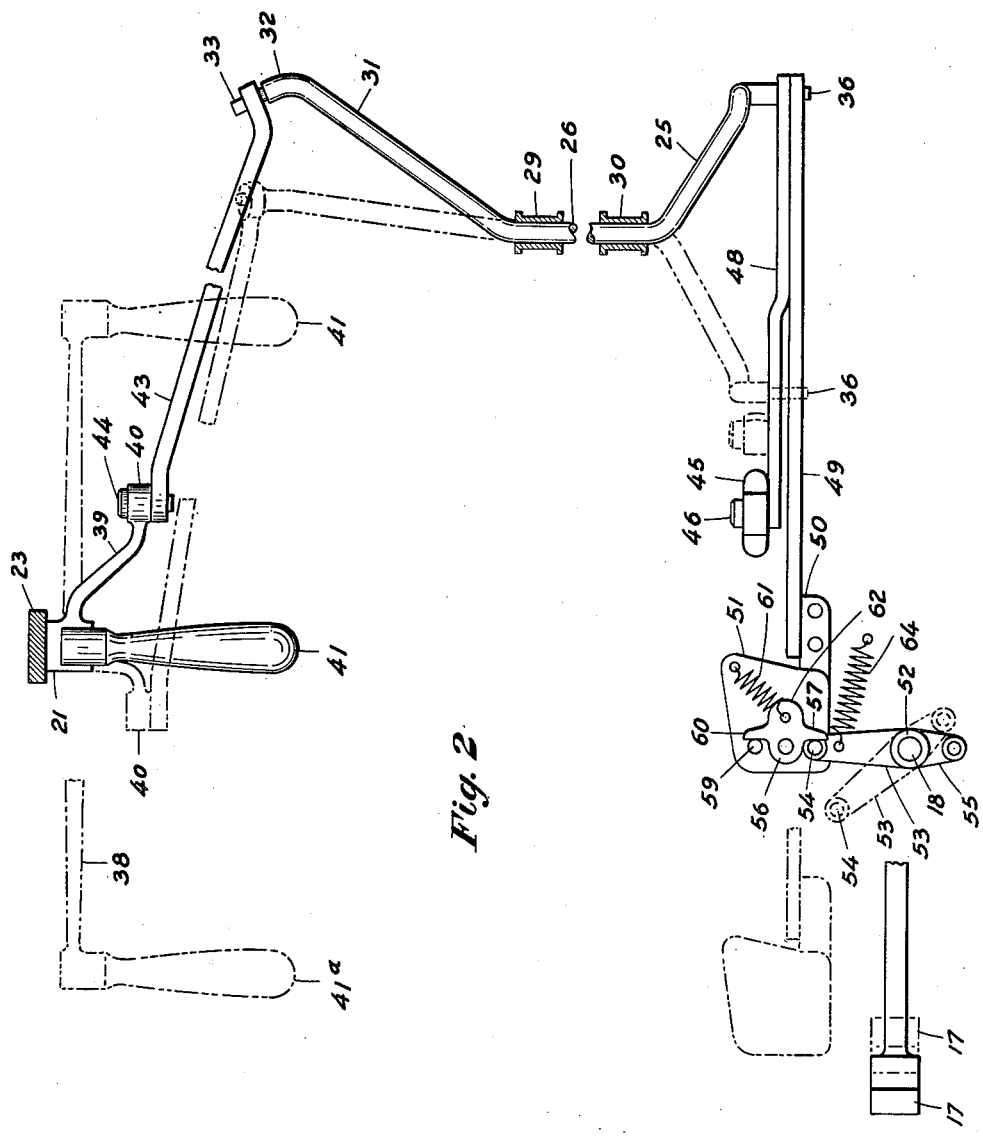
Fig. 2 is a side elevation of one side of the operating mechanism of Fig. 1 for controlling one door, showing the position of the various parts of the door control and latch release mechanism in the closed position, and the position of the parts when the door is partially opened, taken at 2—2, Fig. 1.

One embodiment of the unit, shown in Figs. 1 and 2, may be mounted in the conventional type of two-compartment automobile body, which comprises a top, a pair of side panels 11, located at opposite sides of the body, with a pair of doors 12 hingedly attached to the adjacent side panels, the doors being located in the rear compartment of the vehicle body behind the front, or driver's seat.

One side of each of the doors 12 is hingedly attached to the adjacent body side panel 11 by a plurality of hinges 14, one leaf 15 of each of said hinges being attached to the body side panel with the opposite leaf 15a attached to one side of the door.

As indicated in Figs. 2 and 3, a latch 17 is slidably fitted to one side of each of the doors, opposite the hinges, the latch being normally controlled by a handle (not shown) on a rotatable shaft 18, fitted to the door, a linkage connecting the door handle to the latch, so that the latch may be released by moving the handle through a predetermined angle.

In the control apparatus, shown in Figs. 1, 2 and 3, a pair of control levers 20 and 20a is mounted at the top of the vehicle body, above the head of the driver, the hub 21 of each of said control levers being pivotally supported by a pin or bolt 22 or 22a, both pins being supported by a cross-bar 23, attached to the top of the vehicle body, above the control levers.

A pivoted control rod 25 is mounted on each of the body side panels 11, adjacent the hinged side of the door, the pivoted vertical section 26 of each of the control rods being rotatably supported by a pair of brackets 27 and 28, into which a pair of bushings 29 and 30 is fitted, as indicated in Fig. 3, the bushings rotatably supporting the vertical section of the control rod.

The upper portion of each control rod 25, integral with the pivoted vertical section 26 thereof, comprises an angularly disposed upper section 31, with an angular upper projection 32 integral with and angularly disposed thereto, a reduced diameter upper rod end 33 extending upward from the upper projection, in substantial axial alignment therewith.

The lower portion of the control rod comprises a substantially horizontal section 34, integral with the pivoted vertical section and located in a plane substantially perpendicular to the plane of the angularly disposed upper section 31 and the upper rod end 33, integral therewith. The outer end of the horizontal section of the control rod is bent downward to form an integral lower section 35, substantially perpendicular to the horizontal section, a reduced diameter lower rod end 36, integral with the lower section, and in substantial axial alignment therewith, extending downward beyond the control rod lower section, as indicated in Figs. 2 and 3.

As indicated in Fig. 1, the right-hand control lever 20, viewed from the rear of the vehicle body, comprises a hub 21 pivotally supported by a pin or bolt 22, the control arm 38 of the lever, which is integral with the hub, is located in a plane substantially parallel to the top of the vehicle, being substantially parallel to the control lever cross-bar 23 in the closed position, shown in Figs. 1 and 2.

The operating arm 39 of the control lever, angularly disposed to the control arm, and integral with the lever hub 21, depends angularly downward from the hub 21, a boss 40 being formed integral with the opposite end of the operating arm 39. A control handle 41 or 41a is attached to the opposite end of the control arm of each of the levers 20 and 20a, the control handles being located near the longitudinal center of the vehicle body, and in substantial alignment with the control lever hubs 21 and 21a, when both doors are in the closed position, shown in Figs. 1, 1a and 2.

A control link 43, made of substantially rectangular material, bent to suit the requirements of the operating arm boss 40 of the control lever, and the upper rod end 33 of the control rod, connects the operating arm of the control lever with the upper rod end 33 of the control rod 25, in the manner indicated in Figs. 1 and 2, a pivot pin 44 pivotally connecting the forward end of the control link 43 with the boss 40, at the end of the operating arm of the control lever, an opening through the opposite end of the control link fitting over the upper rod end 33 of the control rod. This enables the control link 43 to rotate the pivoted vertical section 26 of the control rod, within the bushings 29 and 30, when the control link is moved from the closed position, shown in Fig. 1, to the door opening position, shown in dot-dash lines, Fig. 1, when the control arm 38 of the control lever is moved from the closed position, in substantial alignment with the cross-bar 23, through a predetermined angle to the open position, shown by dot-dash lines Figs. 1 and 2, the angular movement of the lever control arm determining the degree of opening of the door 12 about its hinges. A cotter pin or other suitable retaining means may be inserted in the upper rod end to retain the link on the rod end.

A pivot support bracket 45 is attached to the door at a point between the hinge 14 and the opposite side of the door, in the position shown in Figs. 1 and 2, a pivot pin 46 being supported by the center of the bracket 45.

A door control tie-bar 48, made of a material of substantially rectangular cross-section, is interposed between the door bracket pivot pin, which is fitted to an opening in one end of the tie-bar, and the lower rod end 36 of the control rod 25, which is fitted through an opening in the opposite end of the tie-bar 48.

Another tie-bar 49 is fitted to the lower rod end 36, below the door control tie-bar 48, the opposite end of the tie-bar 49 being attached to a bracket 50, which supports one end of a latch control holder 51, as indicated in Fig. 2.

The latch control handle pivot shaft 18, which has a door handle attached to one end thereof, has a rocking lever 52 attached thereto, the rocking lever comprising a central hub mounted on the pivot shaft, a long upper arm 53, the opposite end of which has a pin 54 attached thereto, and a relatively short lower arm 55 in substantial axial alignment with the upper arm.

A latch control cam 56, pivotally attached to the holder 51, has a lower lip 57, which engages a pin 54, attached to the upper end of the latch control lever upper arm 53, the latch control cam lower lip 57 moving the lever from the closed, substantially vertical position, shown in Fig. 2, through an angle to the open position, shown by dot-dash lines, Fig. 2, at the start of the motion of the lower rod end 36, of the control rod from the closed position, Fig. 1, to the door opening position, shown in dot-dash lines, Figs. 1 and 2.

A stop 59 is provided at the upper end of the latch control holder, the stop 59 engaging an upper lip 60 at the upper end of the control cam to retain the lower lip 57 in engagement with the latch control lever pin 54 during the latch opening movement of the lever 52.

A coiled tension spring 61 is interposed between the latch control holder 51 and an ear 62, integral with the control cam, to retain the control cam upper lip in engagement with the stop 59 and still allow the lower lip to ride over the control lever pin 54 during the return movement of the latch control holder 51 from the door opening position to the closed position, shown in Fig. 2.

Another coiled tension spring 64, attached to the upper arm 53 of the latch control lever 52, restores the lever to its normal or closed position, shown in Fig. 2, when the pressure of the lower lip 57 of the cam against the latch control lever arm pin 54 is released by the continued movement of the lower rod end 36 of the control rod, and the latch control holder attached thereto, toward the door opening position.

The lower arm 55 of the latch control lever 52 is connected to the door latch 17 by a linkage (not shown), which moves the latch 17 from the latching position, shown in Fig. 2, to the release position, shown in dot-dash lines, Fig. 2.

After the doors have been opened for the required period, the operator reverses the movement of the door control lever, the control arm 38 of the lever being moved from the open or dot-dash position, Fig. 1, to the closed position Fig. 1.

The reverse movement of the control rod moves the lower rod end 36 from the dot-dash position, Figs. 1 and 2, to the closed position, the door control tie-bar 48 moving the door from the open position, dot-dash, Fig. 1, to the closed position, Fig. 1.

The latch 17, which is spring loaded, is automatically moved to the released position by a plate located in the door jamb, a spring automatically restoring the latch to the latched position after the door is closed.

The construction and the method of operation of the left-hand unit is essentially the same as that of the right-hand unit, shown in the drawings and hereinbefore described, the left-hand door being located at the opposite side of the vehicle body.

The control lever 20a, the left-hand control rod, and the various links and tie-rods, connecting the left-hand control rod with the corresponding control lever and door respectively, are essentially the same as those shown in the drawings, the position of the various links and tie-bars and the rotation and angular movement of the control rod being reversed.

The operation of the latch release mechanism on the left-hand door is essentially the same as that shown in the drawings, and hereinbefore described in conjunction with the right-hand door, except that it is located at the opposite side of the vehicle body.

The operation of the unit is substantially as follows:

In order to open either door of the vehicle, the operator moves the control lever handle 41 or 41a from the closed position, shown in Figs. 1 and 1a, to the open position, shown in dot-dash lines, Fig. 1.

The link 43 connecting the control lever with the upper rod end of the control rod, moves the control rod from the door closed position, Fig. 1, to the open position.

shown in dot-dash lines, Figs. 1 and 2, the degree of opening of the door depending upon the angular movement of the door control lever handle.

The movement of the lower rod end 36 of the control rod from the closed position, Fig. 1, to the open position, dot-dash lines, Figs. 1 and 2, moves the door by means of the door control tie-bar from the closed position to the open position.

The start of the motion of the lower rod end 36 of the control rod from the closed position to the open position thereof, moves the latch control tie-bar and the holder attached thereto from the latched position to the latch release position, the latch control lever being moved from the latching position, Fig. 2, to the latch release position, shown in dot-dash lines, Fig. 2.

The closing of the doors is accomplished in essentially the same manner, the respective control levers being moved through an angle from the open position to the closed position, shown in the drawings, the movement of the control rod, the link, and the various tie-bars being the reverse of the path they assume in opening the door.

The form, contour and length of the various links and tie-bars, connecting the control handle with the control rod, and the opposite end of the control rod with the door and the door latch control mechanism, would be adjusted to suit the form and contour of the body of a particular vehicle, and the distance between the location of the control levers in the driving compartment and the doors to be operated thereby.

A control rod housing (not shown) is mounted around the lower portion of the control rod, the housing allowing the lower end of the control rod and the lower rod end thereof to move through the angular range shown in Fig. 1, the housing having an opening through one side thereof, to allow the door control tie-bar and the latch control tie-bar to be connected to the lower rod end of the control rod.

The attachment may be used on any type of motor vehicle body, in which the doors are mounted at a considerable distance from the driving seat.

This includes such vehicles as taxicabs, limousines, motor busses, and various types of motor trucks, having doors at the sides thereof.

The form, contour and size of the control rod would be varied to suit the requirements of a particular installation and the range of movement required in opening the doors as compared to the angular movement of the door control levers from the closed to the open position.

The position of the door control lever and the location of the handle attached thereto may be varied to suit the requirement of a particular installation and body type.

The entire unit, except for a portion of the control levers and a portion of the upper and lower end of the control rod, may be concealed within the body panels and the top, the various links and tie-rods being mounted in the top, the body side panels and the door respectively.

The latch control mechanism and the latch control tie-bar would also be concealed within the door, so that only a very small position of the operating mechanism would be exposed.

It will be apparent to one skilled in the art that applicant's principles may be applied in many modified forms beyond those illustrated and described therein and therefore the following claims should not be limited to the forms illustrated but be deemed to apply to all equivalents as well.

What I claim is:

1. In combination with a motor vehicle body having a side panel located at one side of said body, a door hingedly attached to said side panel, a latch slidably fitted to said door, opposite the hinged side thereof, a latch control shaft rotatably fitted to the door, and spring means normally retaining the latch in the closed position, a combination latch release and door operating mechanism comprising a control lever, means pivotally supporting said control lever adjacent the upper portion of the vehicle body above the door, a control rod fitted to said side panel adjacent the hinged side of the door, each of said control rods comprising a substantially vertical section, an upper rod end integral with the vertical section, said upper rod end being located a short distance from the vertical section to form a crank, a lower rod end integral with the opposite end of said control rod, said lower rod end being substantially parallel to the vertical section and located a greater distance therefrom than the upper rod end, means attached to the vehicle side panel rotatably supporting the adjacent control rod vertical section, means operatively connecting the control lever with the upper rod end of the control rod, means operatively connecting the lower rod end of the control rod with the adjacent door, a latch release lever mounted on the latch control shaft of the door, means operatively connecting one end of said latch release lever with the lower rod end of the control rod to move the latch release lever in one direction, the opposite end of said latch release lever being operatively connected to the latch, the angular movement of the control lever about its pivot being co-ordinated to move the control rod through a corresponding angle, to progressively release the latch and open the door.

2. In combination with a motor vehicle body having a side panel located at one side of said body, a door hingedly attached to said side panel, a latch slidably fitted to said door, opposite the hinged side thereof, and a latch control shaft rotatably fitted to the door, with spring means fitted to the latch operative to normally retain the latch in the closed position, a door operating mechanism comprising a control lever, a cross-bar attached to the upper portion of the body above the door pivotally supporting the control lever, said control lever having a control arm and an operating arm angularly disposed to one another, with a control handle attached to the control arm, a control rod mounted adjacent the said side panel, said control rod comprising a substantially vertical section, an upper rod end integral with the vertical section, said upper rod end being located a short distance therefrom to form a crank, a lower rod end integral with the opposite end of said control rod, said lower rod end being substantially parallel to the vertical section and located a greater distance therefrom than the upper rod end, means attached to the vehicle side panel rotatably supporting the adjacent control rod vertical section, a link connecting the operating arm of the control lever with the upper rod end of the control rod, a pivot support bracket attached to the door, said pivot support bracket having a door control pivot fitted thereto, a tie-bar connecting the lower rod end of the control rod, with the adjacent door control pivot, angular movement of the control arm of the control lever about its pivot being operative to move the control rod through a corresponding angle to open the door.

3. In combination with a motor vehicle body having a side panel located at one side of said body, a door hingedly attached to said side panel, and a latch slidably fitted to each of said doors, opposite the hinged side thereof, and a latch control shaft rotatably fitted to the door, with spring means fitted to the latch operative to normally retain the latch in the closed position, a combination latch release and door operating mechanism comprising a control lever, means pivotally supporting said control lever adjacent the upper portion of the vehicle body above the door, a control rod mounted adjacent said side panel, said control rod comprising a substantially vertical section, an upper rod end integral with the vertical section, said upper rod end being located a short distance from the vertical section to form a crank, a lower rod integral with the opposite end of said control rod, said lower rod end being substantially parallel to the vertical section and located a greater distance therefrom than the upper rod end, means attached to the vehicle side panel rotatably supporting the adjacent control rod vertical section, a link connecting the control lever with the upper control rod end, a pivot support bracket attached to the door, said pivot support bracket having a door control pivot fitted thereto, a tie-bar connecting the lower rod end of the control rod with the control pivot, a latch release lever attached to the latch control shaft of the door, a tie-bar mechanism operatively connecting the lower rod end of the control rod with one end of the latch release lever to move the latch release lever in one direction, the opposite end of said latch release lever being operatively connected to the latch, the angular movement of the control lever about its pivot being co-ordinated to move the control rod through a corresponding angle to progressively release the latch and open the door.

4. In combination with a motor vehicle body having a side panel located at one side of said body, a door hingedly attached to said side panel, a latch slidably fitted to said door, opposite the hinged side thereof, and a latch control shaft rotatably fitted to the door, with spring means fitted to the latch operative to normally retain the latch in the closed position, a combination latch release and door operating mechanism comprising a control lever, means attached to the upper portion of the body above the door, pivotally supporting the control lever, a control rod mounted adjacent said side panel, said control rod comprising a substantially vertical section, an upper rod end integral with the vertical section, said upper rod end being located a short distance from the vertical section axis to form a crank, a lower rod end integral with the opposite end of the control rod vertical section, said lower rod end being substantially parallel to the vertical section and located a greater distance therefrom than the upper rod end, a plurality of control rod support brackets attached to said side panel, a plurality of bushings fitted to said control rod support brackets rotatably supporting the control rod vertical section, a link operatively connecting the control lever with the upper rod end of the control rod, a pivot support bracket attached to the door, said pivot support bracket having a door control pivot fitted thereto, a tie-bar connecting the door control pivot with the lower rod end of the control rod, a latch release lever attached to the latch control shaft of the door, a tie-bar mechanism operatively connecting the lower rod end of the control rod with one end of the latch release lever to move the latch release lever in one direction, the opposite end of the latch release lever being operatively connected to the latch, the angular movement of the control lever about its pivot being co-ordinated to move the control rod through a corresponding angle, to progressively release the latch and open the door.

5. In combination with a motor vehicle body having a side panel located at one side of said body, a door hingedly attached to said side panel, a latch slidably fitted to said door, opposite the hinged side thereof, and a latch control shaft rotatably fitted to the door, with spring means fitted to the latch operative to normally retain the latch in the closed position, a combination latch release and door operating mechanism comprising a control lever, means pivotally supporting said control lever adjacent the upper portion of the vehicle body above the door, a control rod mounted adjacent said side panel, said control rod comprising a substantially vertical section, an upper rod end integral with the vertical section, said upper rod end being located a short distance from the vertical section to form a crank, a lower rod end integral with the opposite end of said control rod, said lower end being located a greater distance from the vertical section than the upper rod end, means attached to each vehicle side panel rotatably supporting the adjacent control rod vertical section, a link connecting the control lever with the upper control rod end, means operatively connecting the lower rod end of the control rod with the door, a latch releasing lever attached to the door latch control shaft, said latch release lever comprising an upper arm having a pin attached thereto and a lower arm operatively connected to the latch, a tie-bar having one end thereof attached to the lower rod end of the control rod fitted between the lower rod end and the latch release lever, a latch release holder attached to the end of the tie-bar, adjacent the latch release lever, a latch release cam pivotally attached to the latch release holder, said latch release cam having a lower lip engaging the latch release lever pin when the tie-bar is moved toward the latch release lever, the angular movement of the control lever about its pivot being co-ordinated to move the control rod through a corresponding angle to progressively release the latch and open the door.

6. An attachment for a motor vehicle body having a side panel located at one side of the body, a door hingedly attached to said side panel, said door having a latch slidably fitted thereto, opposite the hinged side thereof, a latch control shaft rotatably fitted to the door, with spring means fitted to the latch operative to normally retain the latch in the closed position, comprising a control lever, means attached to the upper portion of the body above the door pivotally supporting the control lever, said control lever having an integral control arm, an operating arm at opposite sides of the pivot, the operating arm being angularly disposed to the control arm, a control rod pivotally supported by said side panel, adjacent the hinged side of the door, said control rod consisting of a substantial vertical section, the upper end of said control rod having a cylindrical upper rod end integral therewith, the upper rod end being angularly disposed to the vertical section and located a short distance from the axis thereof to form a crank, the lower end of said control rod having an integral lower rod end thereon, the lower rod end being substantially parallel to the control rod vertical section and located a greater distance therefrom than the upper rod end, a link operatively connecting the control lever operating arm with the upper control rod end, a pivot support bracket attached to the door, said pivot support bracket having a door control pivot fitted thereto, a tie-bar connecting the lower control rod end with the door control pivot, a latch release lever attached to the latch control shaft of the door, a tie-bar attached to the lower control rod end mounted between the lower rod and one end of the latch release lever, means attached to the latch release lever tie-bar operatively moving said latch release lever in the latch release direction, controlled by the lower rod and movement, the continued movement of the lower rod and movement being operative to open the door.

7. An attachment for a motor vehicle body having a side panel located at one side of the body, a door hingedly attached to said side panel, said door having a latch slidably fitted thereto, opposite the hinged side thereof, and a latch control shaft rotatably fitted to each door, with spring means fitted to the latch operative to normally retain the latch in the closed position, comprising a control lever, means pivotally supporting the control lever adjacent the upper portion of the vehicle body above the doors, a control rod mounted adjacent said side panel, said control rod comprising a substantially vertical section, an upper rod end integral with the vertical section, said upper rod end being located a short distance from the vertical section axis, a lower rod end integral with the opposite end of the control rod vertical section, said lower rod end being located a greater distance from the vertical section than the upper rod end, a plurality of bushings supported by the side panel rotatably supporting the control rod vertical section, a link operatively connecting the control lever with the upper control rod end, a door control pivot fitted to the door, a tie-bar connecting the door control pivot with the lower control rod end, a latch release lever attached to the latch control shaft of the door, said latch release lever having an upper arm with a pin attached thereto, and an arm integral with the upper arm, a tie-bar attached to the lower control rod end fitted between the lower control rod end and the upper latch release lever arm, means attached to the latch release lever tie-bar operatively engaging the latch release lever pin to move the latch release lever in one direction, the opposite arm of the latch release lever being operatively connected to the latch, the angular movement of the control lever about its pivot being operative to move the control rod through a corresponding angle, to progressively release the latch and open the door.

8. An attachment for a motor vehicle body having a side panel located at one side of the body, a door hingedly attached to said side panel, said door having a latch slidably fitted thereto, opposite the hinged side thereof, and a latch control shaft rotatably fitted to the door, with spring means fitted to the latch operative to normally retain the latch in the closed position, comprising a control lever, means pivotally supporting the control lever adjacent the upper portion of the vehicle body above the doors, a control rod mounted adjacent said side panel, said control rod comprising a substantially vertical section, an upper rod end integral with the vertical section, located a short distance therefrom to form a crank, a lower rod end integral with the opposite end of said control rod, said lower rod end being located a greater distance from the vertical section than the upper rod end, means attached to the vehicle side panel rotatably supporting the adjacent control rod vertical section, a link connecting the control lever with the upper control rod end, means operatively connecting the lower control rod end with the door, a latch release lever attached to the door latch control shaft, said latch release lever comprising an upper arm having a projecting pin attached thereto and a lower arm operatively connected to the latch, a tie-bar having one end thereof attached to the lower control rod end, fitted between the lower rod end and the latch release lever, a latch release holder attached to the end of the tie-bar, adjacent the latch release lever, a latch release cam pivotally attached to the latch release holder, said latch release cam having a lower lip engaging the latch release lever pin, when the latch tie-bar is moved toward the latch release lever, the angular movement of the control lever about its pivot being operative to move the control rod through a corresponding angle to progressively release the latch and open the door.

References Cited in the file of this patent
UNITED STATES PATENTS

| | | |
|---|---|---|
| 1,123,405 | Seel | Jan. 5, 1915 |
| 1,142,171 | Hyland | June 8, 1915 |
| 1,214,488 | Bosler | Jan. 30, 1917 |
| 1,338,560 | Delchi | Apr. 27, 1920 |
| 1,969,767 | Steele | Aug. 14, 1934 |